United States Patent
Kailash et al.

(10) Patent No.: US 10,216,790 B2
(45) Date of Patent: Feb. 26, 2019

(54) OPTIMIZED QUERY PROCESSING USING AGGREGATES WITH VARYING GRAIN SIZES

(71) Applicants: Kailash Kailash, San Jose, CA (US); Sushil Pangeni, Kathmandu (NP); Chakkaravarthy Periyasamy Balaiah, Bangalore (IN); Lakshmaiah Regoti, Hyderabad (IN); Kumar Gaurav, Bangalore (IN)

(72) Inventors: Kailash Kailash, San Jose, CA (US); Sushil Pangeni, Kathmandu (NP); Chakkaravarthy Periyasamy Balaiah, Bangalore (IN); Lakshmaiah Regoti, Hyderabad (IN); Kumar Gaurav, Bangalore (IN)

(73) Assignee: Zscaler, Inc., San Jose, CA (US)

( * ) Notice: Subject to any disclaimer, the term of this patent is extended or adjusted under 35 U.S.C. 154(b) by 1065 days.

(21) Appl. No.: 14/459,802

(22) Filed: Aug. 14, 2014

(65) Prior Publication Data
US 2016/0048558 A1    Feb. 18, 2016

(51) Int. Cl.
G06F 17/30    (2006.01)
(52) U.S. Cl.
CPC .............................. *G06F 17/30442* (2013.01)
(58) Field of Classification Search
CPC .................................................. G06F 17/30442
See application file for complete search history.

(56) References Cited

U.S. PATENT DOCUMENTS

| 9,633,076 | B1* | 4/2017 | Morton | G06F 17/30466 |
| 2009/0182779 | A1* | 7/2009 | Johnson | G06F 17/30383 707/999.2 |
| 2010/0275128 | A1* | 10/2010 | Ward | G06Q 10/06 715/744 |
| 2011/0179066 | A1* | 7/2011 | Cardno | G06F 17/30 707/769 |
| 2012/0124043 | A1* | 5/2012 | Handy | G06F 17/30477 707/736 |
| 2015/0370816 | A1* | 12/2015 | Anand | G06F 17/30091 707/782 |

* cited by examiner

*Primary Examiner* — Ashish Thomas
*Assistant Examiner* — Jedidiah P Ferrer
(74) *Attorney, Agent, or Firm* — Clements Bernard Walker PLLC; Lawrence A. Baratta, Jr.

(57) ABSTRACT

A computer-implemented method and system for querying aggregates in a database include maintaining aggregates based on a dimension in the database with at least two grain sizes; receiving a query of the aggregates for a defined range of the dimension; finding a start and an end for a read operation for a larger grain size of the at least two grain sizes of the aggregates for the defined range; reading a first set from the start to the end in the database of the larger grain size of the at least two grain sizes of the aggregates; reading a second set comprising a smaller grain size of the at least two grain sizes of the aggregates based on the defined range and the start and the end; and adjusting the first set with the second set.

15 Claims, 6 Drawing Sheets

OPTIMIZED QUERY PROCESSING USING AGGREGATES WITH VARYING GRAIN SIZES

FIELD OF THE DISCLOSURE

The present disclosure relates generally to computer systems and methods. More particularly, the present disclosure relates to optimized query processing systems and methods using aggregates with varying grain sizes for time series data.

BACKGROUND OF THE DISCLOSURE

Aggregates are commonly used to speed up queries in data warehousing. Whenever time is one of the attributes, it is common to maintain pre-computed aggregates on coarser units of time like hours and days. Depending on the granularity of time used in queries, either hourly or daily aggregates may be used. However, there are cases where it may not be obviously possible to use daily aggregates even though the granularity of time referenced in the query is a day. One example is when daily aggregates are computed each day on GMT boundary. If an incoming query references time in GMT and the granularity of time referenced in query is not finer than a day, it is straightforward to use daily aggregates. However, if the incoming query references time in a different time zone, even though the granularity of incoming query is a day, it is not straightforward to use daily aggregates and one may end up using hourly aggregates. A similar problem results even if the time zone is GMT if the user would want to consider the start of day as 09:00:00 hours rather than 00:00:00 hours.

BRIEF SUMMARY OF THE DISCLOSURE

In an exemplary embodiment, a computer-implemented method for querying aggregates in a database includes maintaining aggregates based on a dimension in the database with at least two grain sizes; receiving a query of the aggregates for a defined range of the dimension; finding a start and an end for a read operation for a larger grain size of the at least two grain sizes of the aggregates for the defined range; reading a first set from the start to the end in the database of the larger grain size of the at least two grain sizes of the aggregates; reading a second set including a smaller grain size of the at least two grain sizes of the aggregates based on the defined range and the start and the end; and adjusting the first set with the second set. The computer-implemented method can further include maintaining the aggregates based on the dimension including time and with one of the at least two grain sizes including a day based on GMT boundaries. The computer-implemented method can further include performing the adjusting by subtracting or adding a portion of the second set at either or both ends of the dimension of the first set. The at least two grain sizes can include a fine grain and a coarse grain; and the computer-implemented method can further include processing the coarse grain aggregates to form the first set; and performing one or more of processing the fine grain aggregates from the second set and excluding the fine grain aggregates from the second set to perform the adjusting. The computer-implemented method can further include receiving the query with the defined range and a time interval; and processing the aggregates based on the time interval. The computer-implemented method can further include performing the reading steps based on an exclusion threshold set to minimize a number of reads.

In an exemplary embodiment, a system includes a network interface, a data store including a database, and a processor, each communicatively coupled therebetween; and memory storing instructions that, when executed, cause the processor to: maintain aggregates based on a dimension in the database with at least two grain sizes; receive a query of the aggregates for a defined range of the dimension; find a start and an end for a read operation for a larger grain size of the at least two grain sizes of the aggregates for the defined range; read a first set from the start to the end in the database of the larger grain size of the at least two grain sizes of the aggregates; read a second set including a smaller grain size of the at least two grain sizes of the aggregates based on the defined range and the start and the end; and adjust the first set with the second set. The memory storing instructions that, when executed, can further cause the processor to: maintain the aggregates based on the dimension including time and with one of the at least two grain sizes including a day based on GMT boundaries. The memory storing instructions that, when executed, can further cause the processor to: perform the adjusting by subtracting or adding a portion of the second set at either or both ends of the dimension of the first set. The at least two grain sizes can include a fine grain and a coarse grain, and wherein the memory storing instructions that, when executed, can further cause the processor to: process the coarse grain aggregates to form the first set; and perform one or more of processing the fine grain aggregates from the second set and excluding the fine grain aggregates from the second set to perform the adjusting. The memory storing instructions that, when executed, can further cause the processor to: receive the query with the defined range and a time interval; and process the aggregates based on the time interval. The memory storing instructions that, when executed, can further cause the processor to: perform the reading steps based on an exclusion threshold set to minimize a number of reads.

In yet another exemplary embodiment, software stored in a non-transitory computer readable medium and including instructions executable by a processor, and in response to such execution causes the processor to perform operations including maintaining aggregates based on a dimension in the database with at least two grain sizes; receiving a query of the aggregates for a defined range of the dimension; finding a start and an end for a read operation for a larger grain size of the at least two grain sizes of the aggregates for the defined range; reading a first set from the start to the end in the database of the larger grain size of the at least two grain sizes of the aggregates; reading a second set including a smaller grain size of the at least two grain sizes of the aggregates based on the defined range and the start and the end; and adjusting the first set with the second set.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, optimized query processing systems and methods using aggregates with varying grain sizes for time series data are described. The optimized query processing systems and methods improve data processing in large data systems. Specifically, the optimized query processing systems and methods determine a most optimal way of using all the aggregates for a given input query which results in a sequential read operation for coarser grain aggregates. Even if the aggregates are maintained according to a chosen time zone, the optimized query processing systems and methods enable processing queries from different time zones. In the foregoing description, examples deal with time as a dimension for illustration purposes; those of ordinary skill in the art will recognize the optimized query processing systems and methods can be used on other dimensions as well.

Figure 1:
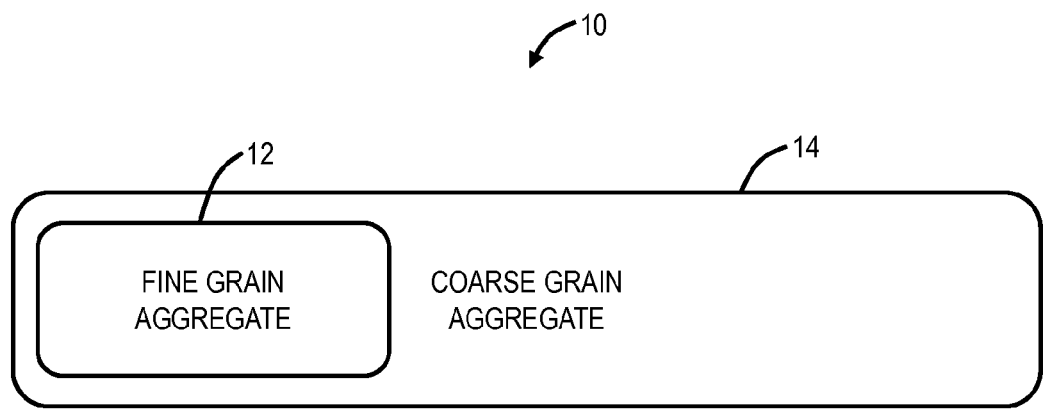
FIG. 1 is a logical diagram of a data system including fine grain aggregates and coarse grain aggregates associated with a query.
Figure 2:
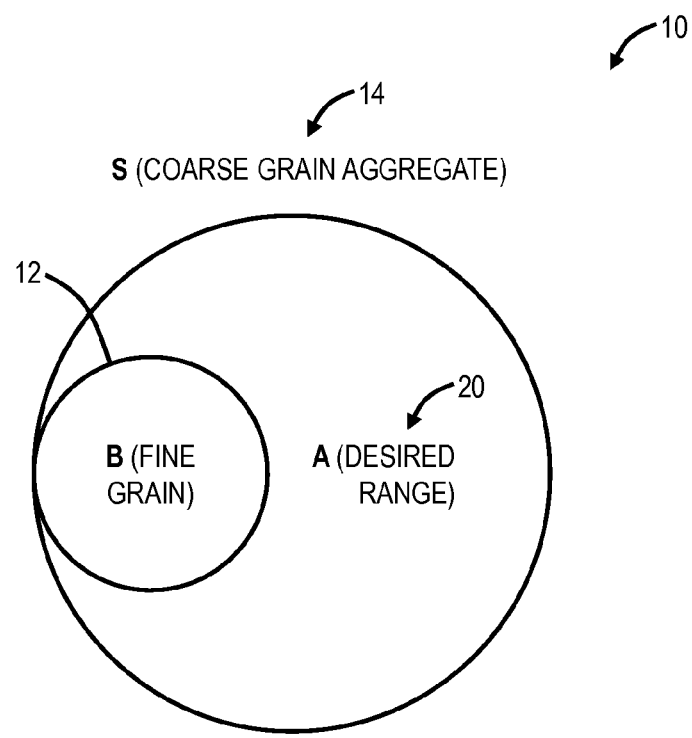
FIG. 2 is another logical diagram of the data system including fine grain aggregates and coarse grain aggregates associated with a query.

Referring to FIGS. 1-2, in an exemplary embodiment, logical diagrams illustrate a data system 10 including fine grain aggregates 12 and coarse grain aggregates 14 associated with a query 20. The coarse grain aggregates 14 deal with a larger dimension than the fine grain aggregate 12. For example, with time as the dimension, the coarse grain aggregates 14 can be in days and the fine grain aggregates 12 can be in hours. The dimension for the coarse grain aggregates 14 is greater than the dimension for the fine grain aggregates 12. A specific coarse grain aggregate 14 is equivalent to a set number of fine grain aggregates 12. Again, in the time dimension example, one coarse grain aggregate 14 as a day is equivalent to 24 fine grain aggregates 12 over the same day. Note, it is more efficient to read the one coarse grain aggregate 14 than the 24 fine grain aggregates 12. Of course, other dimensions are contemplated for the aggregates 12, 14.

The optimized query processing systems and methods include procedures to make use of the coarse grain aggregates 14 as much as possible in combination with fine grain aggregates 12 to answer such queries where otherwise only the fine grain aggregates 12 would be used. In this manner, the optimized query processing systems and methods seek to minimize read operations by maximizing use of the coarse grain aggregates 14 as much as possible. Generally, the query 20 is split into three components, namely (1) portion of the range that can be mapped directly into the coarse grain aggregates 14 maintained by the data system 10, (2) portion of the range that precedes (1), and (3) portion of the range that succeeds (1).

Example (1)

Again, there are the two types of aggregates 12, 14, the fine grain aggregate 12 can have a dimension and size of an hour and the coarse grain aggregate 14 can have the dimension and size of a day. The input query 20 request for this example can be a time range from 1 Feb. 2014 07:00 to 3 Feb. 2014 07:00 and the aggregate function is SUMO. Assume the coarse grain aggregate 14 for each day are stored from 00:00 hours, and since the coarse grain aggregate 14 (daily data) starts only from 00:00 hours, it is not possible to use it directly. Here is a breakdown on how the query 20 would be processed.

TABLE 1

| Time Range | Aggregate Used | Operation |
|---|---|---|
| $1^{st}$ Feb 07:00 To $2^{nd}$ Feb 00:00 | fine grain (hourly) | Add 17 hours |
| $2^{nd}$ Feb 00:00 To $3^{rd}$ Feb 00:00 | coarse grain (daily) | Add 1 day (24 hours) |
| $3^{rd}$ Feb 00:00 To $3^{rd}$ Feb 07:00 | fine grain (hourly) | Add 7 hours |

The Table 1 shows how the input time range is split. Again, the goal is split the usage such that the coarse grain aggregate 14 usage is the largest. Here, the data system 10 reads one day worth of data from coarse grain aggregate 14 as well as reading and adding 17 hours for the first split and 7 hours from the third split using the fine grain aggregates 12.

For further optimization, the data system 10 always wants to read more of the coarse grain aggregate 14 even if the start and the end range of the coarse grain aggregate 14 may be outside the desired range. In FIG. 1, it is shown that the coarse grain aggregate 14 start and end range is more than the range of the data to be processed, but the data system 10 could still go ahead and read the coarse grain aggregate 14 and then exclude the undesired data range using the fine grain aggregate 12.

In FIG. 2, let S be the set that represents a set of coarse grain aggregates 14 and B be the set that represents one or more fine grain aggregates 14. An aggregate function, $F_n$, can be calculated over set A, $$F_n(A)=F_n(S-B)=F_n(F_n(S), F_n^{-1}(B))$$

If there exist such function $F_n^{-1}$ (inverse of $F_n$) that the above equation is true, then the data system 10 can use the exclusion optimization for such a function. For example if $F_n$=SUM( ), then:

$$\begin{aligned}SUM(A) &= SUM(S-A)\\ &= SUM(SUM(S), MINUS(SUM(A)))\end{aligned}$$

since inverse of $SUM(x) = MINUS(SUM(x))$

Functions such as MIN or MAX cannot use the exclusion optimization. However, normal methods of combining the aggregates (without exclusion) would still work fine for such functions.

Example of Exclusion in Action

When using exclusion for aggregate functions like SUM, the data system 10 needs to subtract the excluded data from the result set. That is, the data system 10 uses the coarse grain aggregate 14 to overlap and the fine grain aggregates 12 for exclusion. In the previous example (1), the data system 10 only used additions. For the first range from $1^{st}$ February 07:00 to $2^{nd}$ February 00:00, the data system 10 added 17 hours of data. The usage of the coarse grain aggregate 14 could further be improved by applying subtraction (exclusion) as shown in Table 2 below.

TABLE 2

| Time Range | Aggregate Used | Operation |
| --- | --- | --- |
| 1$^{st}$ Feb 00:00 To 3$^{rd}$ Feb 00:00 | coarse grain (daily) | Add 3 days (72 hours) |
| 1$^{st}$ Feb 00:00 To 1$^{st}$ Feb 07:00 | fine grain (hourly) | Subtract 7 hours |
| 3$^{rd}$ Feb 00:00 To 3$^{rd}$ Feb 07:00 | fine grain (hourly) | Add 7 hours |

By simply introducing the capability of subtraction, the data system 10 has reduced the amount read from the fine grain aggregates 12 to 14 hours instead of 24 hours. In most cases, introducing subtraction results in reduced number of read operation and increases the utilization of coarser grain aggregates 14.

Using Caching to Improve Reads of Aggregate Data

Let's extend the above examples by doing range queries with intervals as 3 days and the query range as 9 days. The data system 10 has 3 intervals to process. Query start time is 1 Feb. 2014 07:00 and end time is 9 Feb. 2014 07:00, and operations by the data system 10 are shown in Table 3.

TABLE 3

| Interval | Time Range | Aggregate Used | Operation |
| --- | --- | --- | --- |
| 1$^{St}$ Feb 07:00 to 3$^{rd}$ Feb 07:00 | 1$^{st}$ Feb 00:00 To 3$^{rd}$ Feb 00:00 | coarse grain (daily) | Add 3 days (72 hours) |
| | 1$^{st}$ Feb 00:00 To 1$^{st}$ Feb 07:00 | fine grain (hourly) | Subtract 7 hours |
| | 3$^{rd}$ Feb 00:00 To 3$^{rd}$ Feb 07:00 | Fine grain (hourly) | Add 7 hours (this data is reused in next interval) |
| 3$^{rd}$ Feb 07:00 to 6$^{th}$ Feb 07:00 | 3$^{rd}$ Feb 00:00 To 6$^{th}$ Feb 00:00 | coarse grain (daily) | Add 3 days (72 hours) |
| | 3$^{rd}$ Feb 00:00 To 3$^{rd}$ Feb 07:00 | fine grain (hourly) | Subtract 7 hours. It's the same data added in the first interval. Can utilize the same for subtraction. |
| | 6$^{th}$ Feb 00:00 To 6$^{th}$ Feb 07:00 | Fine grain (hourly) | 7 hours data is added |
| 6$^{th}$ Feb 07:00 to 9$^{th}$ Feb 07:00 | 6$^{th}$ Feb 00:00 To 9$^{th}$ Feb 00:00 | coarse grain (daily) | Add 3 days (72 hours) |
| | 6$^{th}$ Feb 00:00 To 6$^{th}$ Feb 07:00 | fine grain (hourly) | Subtract 7 hours. It's the same data added in the second interval. Can utilize the same for subtraction. |
| | 9$^{th}$ Feb 00:00 To 9$^{th}$ Feb 07:00 | Fine grain (hourly) | Add 7 hours |

In the Table 3, it is shown that data from 3rd February 00:00 to 3rd February 07:00 that was added in the first interval (1st February 07:00 to 3rd February 07:00) can be reused for subtraction in the second interval (3rd February 07:00 to 6th February 07:00). Enabling subtraction also enables efficient utilization of cache data and overall reduction of input/output required from storage layer of the data system 10.

Optimized Query Processing Systems and Methods

Figure 3:
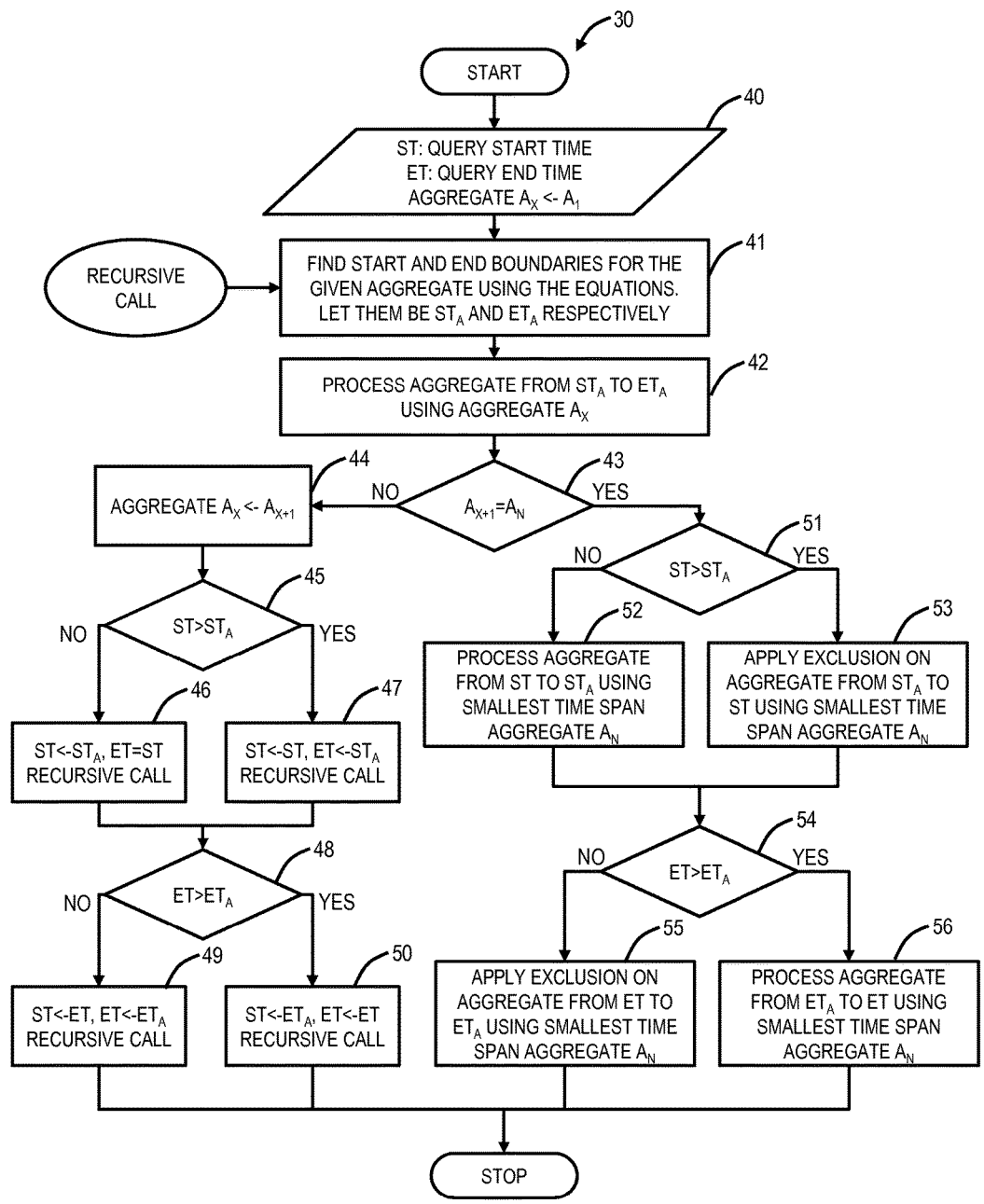
FIG. 3 is a flowchart of an optimized query processing method with an arbitrary number of grain sizes.
Figure 4:
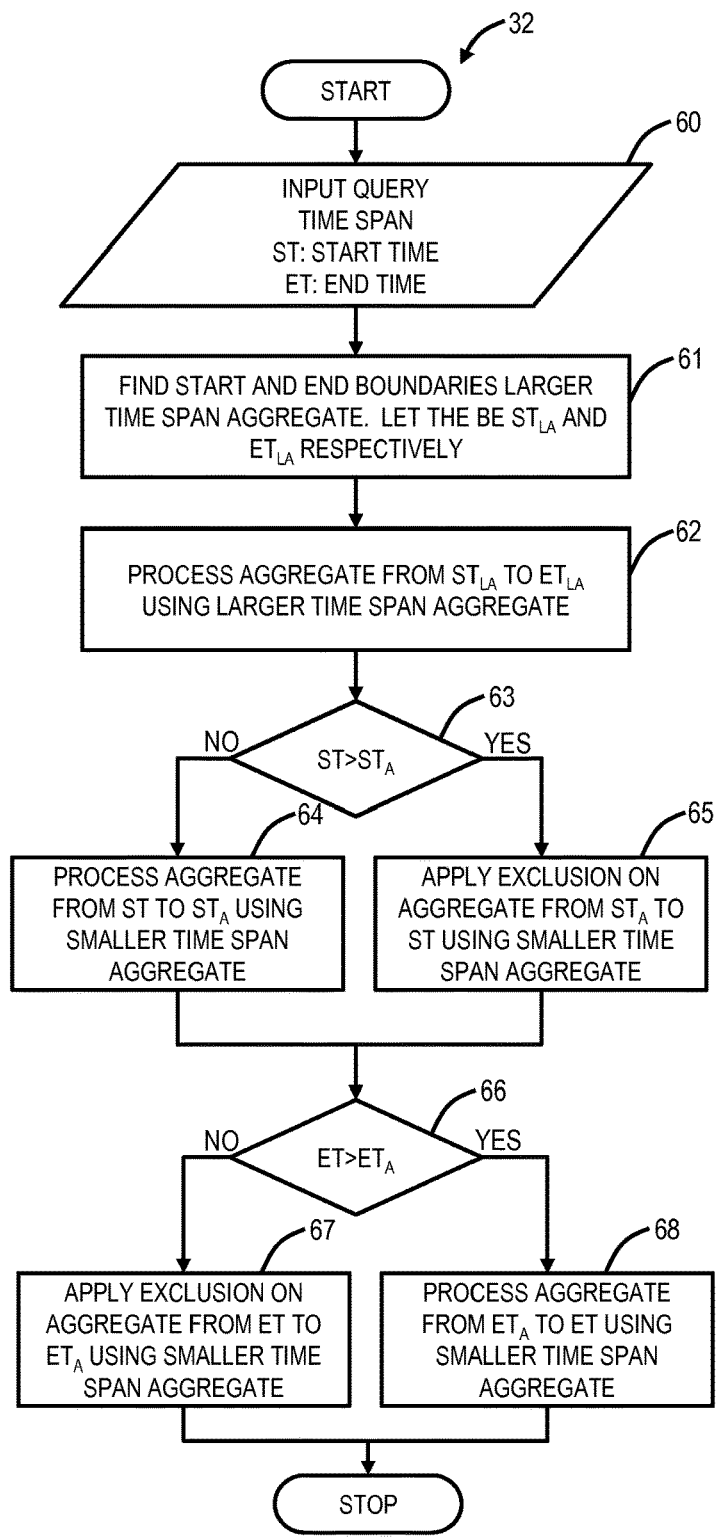
FIG. 4 is a flowchart of an optimized query processing method with an fine and coarse grain aggregates.
Figure 5:
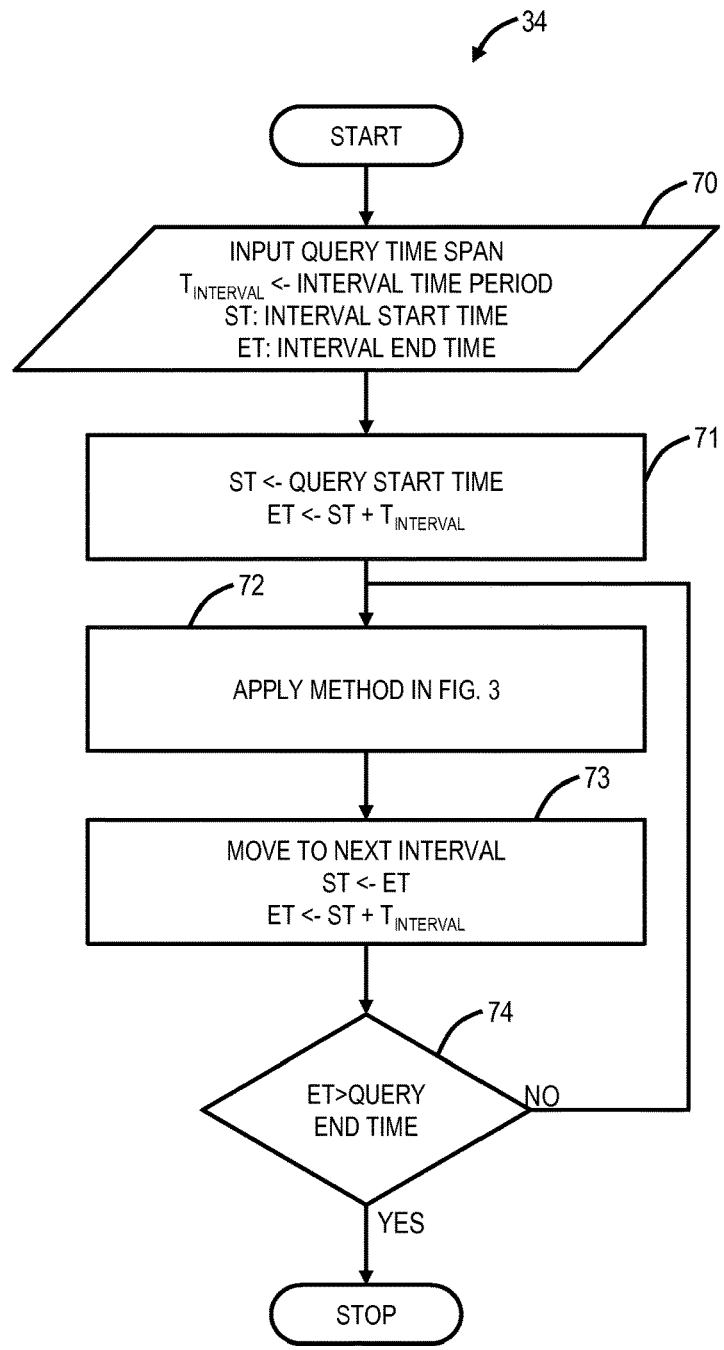
FIG. 5 is a flowchart of an optimized query processing method using the optimized query processing method of FIG. 3 for intervals.

Referring to FIGS. 3, 4, and 5, in an exemplary embodiment, flowcharts illustrate optimized query processing methods 30, 32, 34. The optimized query processing systems and methods handle large range queries on aggregates in the most optimized way while maximizing the usage of coarse grain aggregates when multiple aggregates each of different grain size are present. The assumption that the optimized query processing systems and methods include are: 1) Range means a variation in upper and lower limit on a scale of a particular dimension that represents a sequence or order; 2) The input query is associative operation on the aggregate data; and 3) Coarser grain aggregates represent more condensed data then the finer grained aggregates and also occupy smaller storage space.

Time is the most common dimension that can be divided into range and is very popular in event logs and streaming data. Again, in the examples and algorithms described herein, time is used as the dimension since it is very easy to visualize time ranges. Other dimensions are also contemplated.

The grain size of these aggregates could vary from small variation on the value of the dimension to a large variation. For example, time based aggregates could have the aggregate grain size as hour, day or month. An input query with large time span operation can then be processed using combination of these aggregates. For example if the solution contains aggregates of hourly (fine grain) and daily (coarse grain) time span, then an input query of time span of two days could be answered using combination of both the fine and coarse grain aggregates as shown in examples above at Table 1 and Table 2.

Figuring Out the Read Operation Range Boundaries for Time Based Aggregates

By definition and implication of input query range, the start and the end range values of the query cannot be changed. But data read range (used for read operation) can be changed to get the optimal performance. So the challenge is, for a given query range finding the start and the end for the read operation for all the available aggregates. The following describes arriving at equations for finding out read ranges for aggregates of varying granularity to satisfy a query. All units in the equation below are the same as the unit of the finest grain size aggregate. The following terminology is used:

| | |
| --- | --- |
| Read start time | The start time for the read operation |
| Read end time | The end time for the read operation |
| Query start time | The start time of the query |
| Interval end | The end time of the interval |
| Unaligned start | Amount of time unaligned at the start with respect to query start time |
| Unaligned end | Amount of time unaligned at the end with respect to query end time |
| Aggregate grain size (aggGrainSz) | Time period of the aggregate |
| Exclusion Threshold (exThres): | The maximum exclusion (in terms of time) allowed for adjustment |

The exThres is the property of the aggregate and the granularity of the exclusion unit should be the granularity of the next finer aggregate. For example, if the aggregate the data system 10 is applying has a time span of day and the immediate finer time span for aggregate is hourly, then exThres should be in terms of hours.

The following equations are used in the optimized query processing method 30:

$$\text{unaligned start} = \text{query start time} \% \, aggGrainSz$$

$$\text{unaligned end} = \text{query end time} \% \, aggGrainSz$$

$$\text{read start time} =$$
$$\begin{cases} \text{query start time} - \text{unaligned start}, & \text{unaligned start} < exThres \\ \text{query start time} - \text{unaligned start} + aggGrainSz, & \\ & \text{unaligned start} \geq exThres \end{cases}$$

$$\text{read end time} =$$
$$\begin{cases} \text{query end time} - \text{unaligned end}, & \text{unaligned end} < aggGrainSz - exThres \\ \text{query end time} - \text{unaligned end} + aggGrainSz, & \\ & \text{unaligned end} \geq aggGrainSz - exThres \end{cases}$$

Choosing the Value of Exclusion Threshold

The exclusion threshold (exThres) determines for what amount of un-alignment in the query range, exclusion should be preferred over normal inclusion (addition) method. By default, for most of the cases the value should be equal to half of the grain size of the aggregate. For example an aggregate with grain size of a day, the exclusion threshold should be half a day but the actual value depends on the next immediate finer grained aggregate. For example, in this case of the next immediate aggregates grain size was hour then the value would be 12 hours or if the next immediate grain size was minute then the value would be 720 minutes. Setting this value to zero would effectively turn off this optimization. When applying aggregate functions that cannot be evaluated with exclusion, this value should be set to zero to disable exclusion.

Algorithm to Find Range Boundaries for all Time Based Aggregates

FIG. 3 shows the flowchart for the optimized query processing method 30. Note that the exThres is the property of the aggregate and should be changed every time the equation is applied on a new aggregate. The optimized query processing method 30 includes the following:
  1. Start with the coarsest aggregate remaining to be processed. Let it be $A_x$.
  2. Evaluate the equation for aggregate Ax and find the read operation time boundaries.
  3. The difference between the read start time and query start time needs to be processed using finer grained aggregates. This difference could either be negative (meaning exclusion/subtraction is needed) or positive (meaning inclusion/addition is needed).
  4. If there are more than two finer grained aggregates unprocessed, repeat the algorithm recursively through step 2, first for the head difference and then again for the tail difference. For this invocation, substitute the query start and end range with actual start and end time of the range being processed. For example, during head adjustment the start and the end time would correspond only to the head portion and not the entire query range.
  5. Process recursively until we reach the aggregate with the finest grain size. The remaining unadjusted time range is processed using this finest grain size aggregate.

The optimized query processing method 30 starts setting ST to query start time, ET to query end time, and aggregate $A_x$ to $A_1$ (step 40). The optimized query processing method 30 finds the start and end boundaries for the given boundaries using the above equations; let them be $ST_A$ and $ET_A$ respectively (step 41). The optimized query processing method 30 processes aggregates from $ST_A$ to $ET_A$ using aggregate $A_X$ (step 42). The optimized query processing method 30 checks if $A_{X+1} = A_X$ (step 43). If not (step 43), the optimized query processing method 30 sets the aggregate $A_X$ to aggregate $A_{X+1}$ (step 44), and the optimized query processing method 30 checks if ST is greater than $ST_A$ (step 45). If ST is less than or equal to STA (step 45), the optimized query processing method 30 sets ST to $ST_A$ and ET to ST and performs a recursive call (step 46). If ST is greater than $ST_A$ (step 45), the optimized query processing method 30 sets ST to ST and ET to $ST_A$ and performs a recursive call (step 47). Subsequent to the steps 46, 47, the optimized query processing method 30 checks if ET is greater than $ET_A$ (step 48).

If ET is less than or equal to $ET_A$ (step 48), the optimized query processing method 30 sets ST to ET and ET to $ET_A$ and performs a recursive call (step 49). If ET is greater than $ET_A$ (step 48), the optimized query processing method 30 sets ST to $ET_A$ and ET to ET and performs a recursive call (step 50). After the recursive calls, the optimized query processing method 30 returns to the step 41.

If $_{AX+1} = _{AX}$ (step 43), the optimized query processing method 30 checks if ST is greater than $S_{TA}$ (step 51). If ST is less than or equal to $S_{TA}$ (step 52), the optimized query processing method 30 processes aggregate from ST to $S_{TA}$ using smallest time span aggregate $_{AN}$ (step 52). If ST is greater than $S_{TA}$ (step 51), the optimized query processing method 30 applies an exclusion on aggregate from $ST_A$ to ST using smallest time span aggregate $A_N$ (step 53).

The optimized query processing method 30 checks if ET is greater than $E_{TA}$ (step 54). If ET is less than or equal to $E_{TA}$ (step 54), the optimized query processing method 30 applies an exclusion on aggregate from ET to $ET_A$ using smallest time span aggregate $A_N$ (step 55). If ET is greater than $E_{TA}$ (step 54), the optimized query processing method 30 processes aggregate from $ET_A$ to ET using smallest time span aggregate $A_N$ (step 56).

FIG. 4 shows the optimized query processing method 32 when only two different grain sized aggregates are present—one with coarse grain and other with fine grain size. The optimized query processing method 32 receives an input query, time span, start time (ST), and end time (ET) (step 60). The optimized query processing method 32 finds start and end boundaries larger than the time span aggregate—let them be $ST_{LA}$ and $ET_{LA}$ respectively (step 61). The optimized query processing method 32 processes aggregate from $ST_{LA}$ to $ET_{LA}$ using larger time span aggregate (step 62).

The optimized query processing method 32 checks if ST is greater than $ST_A$ (step 63). If ST is less than or equal to $ST_A$ (step 63), the optimized query processing method 32 processes aggregate from ST to $ST_A$ using smaller time span aggregate (step 64). If ST is greater than $ST_A$ (step 63), the optimized query processing method 32 applies exclusion on aggregate from $ST_A$ to ST using smaller time span aggregate (step 65).

The optimized query processing method 32 checks if ET is greater than $ET_A$ (step 66). If ET is less than or equal to $ET_A$ (step 66), the optimized query processing method 32 applies exclusion on aggregate from ET to $ET_A$ using smaller time span aggregate (step 67). If T is greater than $ET_A$ (step 66), the optimized query processing method 32 processes aggregate from $ET_A$ to ET using smaller time span aggregate (step 68).

Processing Queries with Time Interval

So far, the description of herein has been around an entire query range. The methods described herein can be used even when the query range is broken down into intervals. The same procedure is repeated for each interval. The equations above are applied to each interval to determine the break-up of various types of aggregates to be used. The query start time and the query end time in the interval now correspond to interval start time and interval end time respectively. The interval start time of the very first interval is query start time. The interval end time is equals to the interval start time plus the interval period.

$$\text{unaligned start} = \text{interval start time} \% aggGrainSz$$

$$\text{unaligned end} = \text{interval end time} \% aggGrainSz$$

$$\text{read start time} = \begin{cases} \text{interval start time} - \text{unaligned start}, \text{unaligned start} < exThres \\ \text{interval start time} - \text{unaligned start} + aggGrainSz, \\ \text{unaligned start} \geq exThres \end{cases}$$

$$\text{read end time} = \begin{cases} \text{interval end time} - \text{unaligned end}, \text{unaligned end} < \\ aggGrainSz - exThres \\ \text{interval end time} - \text{unaligned end} + aggGrainSz, \\ \text{unaligned end} \geq aggGrainSz - exthres \end{cases}$$

Calculating Intervals $$\text{interval start time} = \begin{cases} \text{query start time}, & \text{interval end time} = 0 \\ \text{interval end time}, & \text{interval end time} \mathrel{!}= 0 \end{cases}$$

The interval end time at the beginning of the algorithm or evaluation is set to 0. Else, it's computed as below $$\text{interval end time} = \begin{cases} \text{interval start time} + & \text{interval start time} + \text{interval period} < \\ \text{interval period}, & \text{query end time} \\ \text{query end time}, & \text{interval start time} + \text{interval period} \geq \\ & \text{query end time} \end{cases}$$

FIG. 5 shows the optimized query processing method 34 for applying the query processing method 30 for interval based queries. The optimized query processing method 34 starts with an input query time span, $T_{INTERVAL}$ set to the interval time period, ST as the interval start time, and ET as the interval end time (step 70). The optimized query processing method 34 sets ST to query start time and ET to $ST+T_{INTERVAL}$ (step 71). The optimized query processing method 34 then performs the optimized query processing method 30 with ST and ST (step 72). Next, the optimized query processing method 34 moves to the next interval with ST set to ET and ET set to $ST+T_{INTERVAL}$ (step 73). Once all intervals are covered (step 74), the optimized query processing method 34 ends, otherwise, the optimized query processing method 34 repeats the optimized query processing method 30 for each interval.

Example Operation

Figure 6:
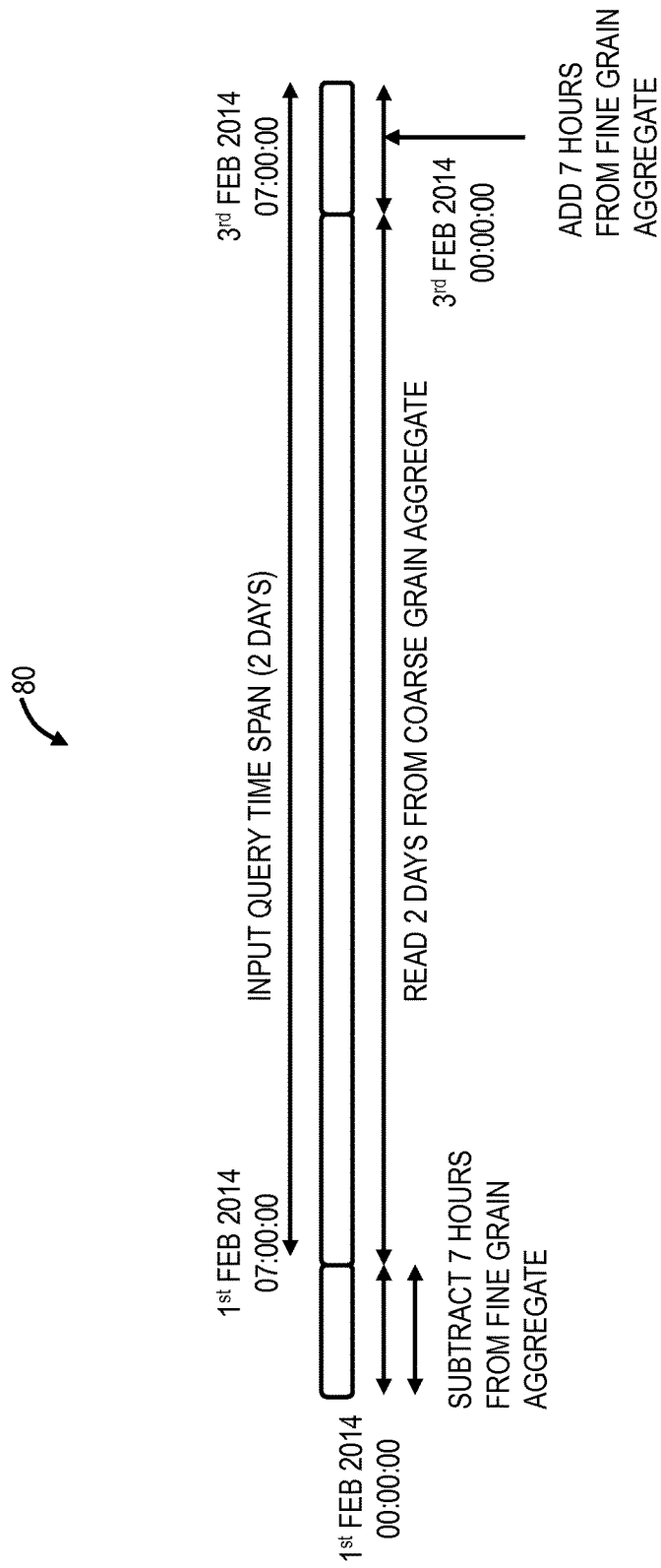
FIG. 6 is a block diagram of an example of the optimized query processing method of FIG. 4.

Referring to FIG. 6, in an exemplary embodiment, a block diagram illustrates an exemplary operation of the optimized query processing method 32. Here, an input query is for 2 days between 1 Feb. 2014 07:00:00 to 3 Feb. 2014 07:00:00. The aggregates are stored as coarse grain aggregates on a day basis according to GMT and fine grain aggregate are stored by hour. In an optimized fashion, here 2 days are read from the coarse grain aggregates—from 1 Feb. 2014 00:00:00 to 3 Feb. 2014 00:00:00, and fine grain aggregates are read by hour from 1 Feb. 2014 00:00:00 to 1 Feb. 2014 07:00:00 (which are subtracted from the $1^{st}$ day of coarse grain aggregates) and by hour from 3 Feb. 2014 00:00:00 to 3 Feb. 2014 07:00:00 (which are added to the $2^{nd}$ day of coarse grain aggregates). In this manner, coarse grain aggregate reads are maximized while fine grain aggregate reads are minimized and only used to adjust the coarse grain aggregates at the edges of the query.

Figure 7:
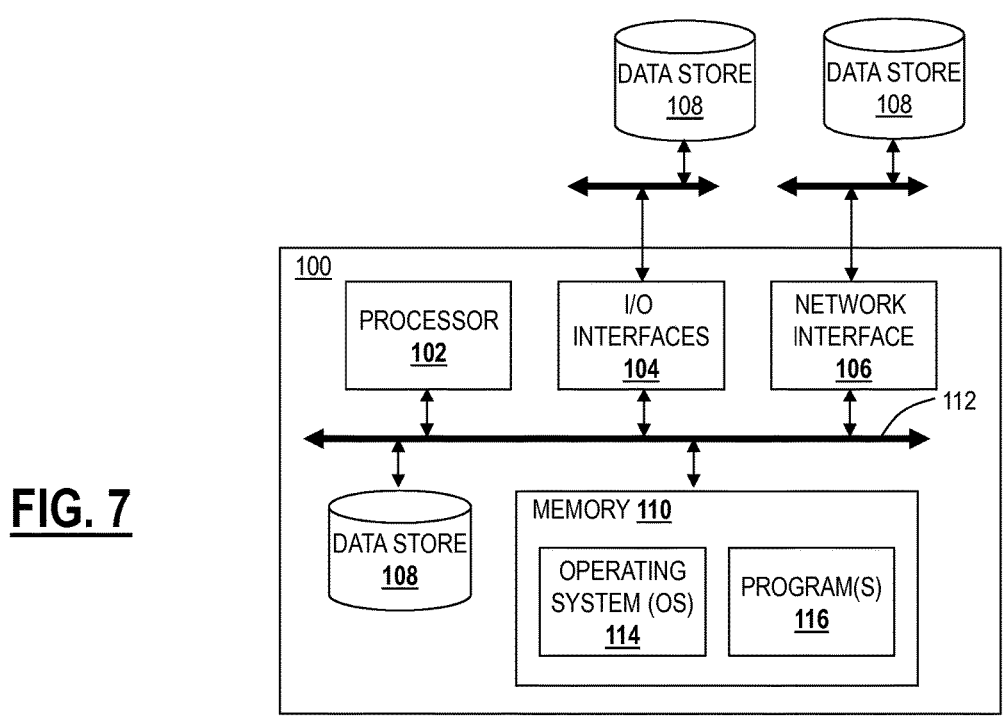
FIG. 7 is a block diagram of a server which may be used for a data system to perform the various optimized query processing methods.

Referring to FIG. 7, in an exemplary embodiment, a block diagram illustrates a server 100 which may be used to realize the optimized query processing methods 30, 32, 34. The server 100 may be a digital computer that, in terms of hardware architecture, generally includes a processor 102, input/output (I/O) interfaces 104, a network interface 106, a data store 108, and memory 110. It should be appreciated by those of ordinary skill in the art that FIG. 7 depicts the server 100 in an oversimplified manner, and a practical embodiment may include additional components and suitably configured processing logic to support known or conventional operating features that are not described in detail herein. The components (102, 104, 106, 108, and 110) are communicatively coupled via a local interface 112. The local interface 112 may be, for example but not limited to, one or more buses or other wired or wireless connections, as is known in the art. The local interface 112 may have additional elements, which are omitted for simplicity, such as controllers, buffers (caches), drivers, repeaters, and receivers, among many others, to enable communications. Further, the local interface 112 may include address, control, and/or data connections to enable appropriate communications among the aforementioned components.

The processor 102 is a hardware device for executing software instructions. The processor 102 may be any custom made or commercially available processor, a central processing unit (CPU), an auxiliary processor among several processors associated with the server 100, a semiconductor-based microprocessor (in the form of a microchip or chip set), or generally any device for executing software instructions. When the server 100 is in operation, the processor 102 is configured to execute software stored within the memory 110, to communicate data to and from the memory 110, and to generally control operations of the server 100 pursuant to the software instructions. The I/O interfaces 104 may be used to receive user input from and/or for providing system output to one or more devices or components. User input may be provided via, for example, a keyboard, touch pad, and/or a mouse. System output may be provided via a display device and a printer (not shown). I/O interfaces 104 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 106 may be used to enable the server 100 to communicate on a network, such as the Internet, a wide area network (WAN), a local area network (LAN), and the like, etc. The network interface 106 may include, for example, an Ethernet card or adapter (e.g., 10BaseT, Fast Ethernet, Gigabit Ethernet, 10GbE) or a wireless local area network (WLAN) card or adapter (e.g., 802.11a/b/g/n). The network interface 106 may include address, control, and/or data connections to enable appropriate communications on the network. A data store 108 may be used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media. In one example, the data store 108 may be located internal to the server 100 such as, for example, an internal hard drive connected to the local interface 112 in the server 100. Additionally in another embodiment, the data store 108 may be located external to the server 100 such as, for example, an external hard drive connected to the I/O interfaces 104 (e.g., SCSI or USB connection). In a further embodiment, the data store 108 may be connected to the server 100 through a network, such as, for example, a network attached file server. The data store 108 can include a database with the fine grain aggregates 12 and the coarse grain aggregates 14.

The memory 110 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 110 may incorporate electronic, magnetic, optical, and/or other types of storage media. Note that the memory 110 may have a distributed architecture, where various components are situated remotely from one another, but can be accessed by the processor 102. The software in memory 110 may include one or more software programs, each of which includes an ordered listing of executable instructions for implementing logical functions. The software in the memory 110 includes a suitable operating system (O/S) 114 and one or more programs 116. The operating system 114 essentially controls the execution of other computer programs, such as the one or more programs 116, and provides scheduling, input-output control, file and data management, memory management, and communication control and related services. The one or more programs 116 may be configured to implement the various processes, algorithms, methods, techniques, etc. described herein.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A computer-implemented method for querying aggregates in a database, comprising:
   maintaining aggregates based on a dimension in the database with at least two grain sizes;
   receiving a query of the aggregates for a defined range;
   finding a start and an end for a read operation for a larger grain size of the at least two grain sizes of the aggregates for the defined range, wherein the finding comprises
      determining an unaligned start and an unaligned end by dividing a query start and a query end of the defined range by the larger grain size,
      determining a read start as the query start minus the unaligned start if the unaligned start is less than an exclusion threshold and as the query start minus the unaligned start plus the larger grain size if the unaligned start is greater than or equal to the exclusion threshold, wherein the exclusion threshold is set to minimize a number of reads in the database, and
      determining a read end as the query end minus the unaligned end if the unaligned end is less than the larger grain size minus the exclusion threshold and as the query end minus the unaligned end plus the larger grain size if the unaligned end is greater than or equal to the larger grain size minus the exclusion threshold;
   reading a first set from the read start to the read end in the database of the larger grain size;
   reading a second set comprising a smaller grain size of the at least two grain sizes of the aggregates for a time period based on a difference between the read start and the query start and between the read end and the query end, wherein a specific larger grain size is equivalent to a set number of the smaller grain size such that each comprises a same type of data at a different level of granularity, and wherein the second set is read over a different range than the first set;

adjusting the first set with the second set by one or more of:
  subtracting a first portion of the second set at either or both ends of the dimension of the first set where the first portion of the second set overlaps the first set, and
  adding a second portion of the second set at either or both ends of the dimension of the first set where the second portion of the second set overlaps the first set; and
providing a response to the query based on the adjusted first set.

2. The computer-implemented method of claim 1, further comprising:
  maintaining the aggregates based on the dimension comprising time and with one of the at least two grain sizes comprising a day based on GMT boundaries.

3. The computer-implemented method of claim 1, wherein the at least two grain sizes comprise a fine grain and a coarse grain; and the method further comprises:
  processing the coarse grain aggregates to form the first set; and
  performing one or more of processing the fine grain aggregates from the second set and excluding the fine grain aggregates from the second set to perform the adjusting.

4. The computer-implemented method of claim 1, further comprising:
  receiving the query with the defined range and a time interval; and
  processing the aggregates based on the time interval.

5. The computer-implemented method of claim 1, wherein the exclusion threshold is set to half a value of the larger grain size.

6. A system, comprising:
  a network interface, a data store comprising a database, and a processor, each communicatively coupled therebetween; and
  memory storing instructions that, when executed, cause the processor to:
    maintain aggregates based on a dimension in the database with at least two grain sizes;
    receive a query of the aggregates for a defined range;
    find a start and an end for a read operation for a larger grain size of the at least two grain sizes of the aggregates for the defined range, wherein the start and the end are found through
      a determination of an unaligned start and an unaligned end by dividing a query start and a query end of the defined range by the larger grain size,
      a determination of a read start as the query start minus the unaligned start if the unaligned start is less than an exclusion threshold and as the query start minus the unaligned start plus the larger grain size if the unaligned start is greater than or equal to the exclusion threshold, wherein the exclusion threshold is set to minimize a number of reads in the database, and
      a determination of a read end as the query end minus the unaligned end if the unaligned end is less than the larger grain size minus the exclusion threshold and as the query end minus the unaligned end plus the larger grain size if the unaligned end is greater than or equal to the larger grain size minus the exclusion threshold;
    read a first set from the read start to the read end in the database of the larger grain size;
    read a second set comprising a smaller grain size of the at least two grain sizes of the aggregates for a time period based on a difference between the read start and the query start and between the read end and the query end, wherein a specific larger grain size is equivalent to a set number of the smaller grain size such that each comprises a same type of data at a different level of granularity, and wherein the second set is read over a different range than the first set;
    adjust the first set with the second set by one or more of:
      subtraction of a first portion of the second set at either or both ends of the dimension of the first set where the first portion of the second set overlaps the first set,
      addition of a second portion of the second set at either or both ends of the dimension of the first set where the second portion of the second set overlaps the first set, and
    provide a response to the query based on the adjusted first set.

7. The system claim 6, wherein the memory storing instructions that, when executed, further cause the processor to:
  maintain the aggregates based on the dimension comprising time and with one of the at least two grain sizes comprising a day based on GMT boundaries.

8. The system claim 6, wherein the at least two grain sizes comprise a fine grain and a coarse grain, and wherein the memory storing instructions that, when executed, further cause the processor to:
  process the coarse grain aggregates to form the first set; and
  perform one or more of processing the fine grain aggregates from the second set and excluding the fine grain aggregates from the second set to perform the adjusting.

9. The system claim 6, wherein the memory storing instructions that, when executed, further cause the processor to:
  receive the query with the defined range and a time interval; and
  process the aggregates based on the time interval.

10. The system claim 6, wherein the exclusion threshold is set to half a value of the larger grain size.

11. A non-transitory computer readable medium storing software comprising instructions executable by a processor, and in response to such execution causes the processor to perform operations comprising:
  maintaining aggregates based on a dimension in the database with at least two grain sizes;
  receiving a query of the aggregates for a defined range of the dimension;
  finding a start and an end for a read operation for a larger grain size of the at least two grain sizes of the aggregates for the defined range, wherein the finding comprises
    determining an unaligned start and an unaligned end by dividing a query start and a query end of the defined range by the larger grain size,
    determining a read start as the query start minus the unaligned start if the unaligned start is less than an exclusion threshold and as the query start minus the unaligned start plus the larger grain size if the unaligned start is greater than or equal to the exclusion threshold, wherein the exclusion threshold is set to minimize a number of reads in the database, and determining a read end as the query end minus the unaligned end if the unaligned end is less than the larger grain size minus the exclusion threshold and as the query end minus the unaligned end plus the larger grain size if the unaligned end is greater than or equal to the larger grain size minus the exclusion threshold;

reading a first set from the read start to the read end in the database of the larger grain size;

reading a second set comprising a smaller grain size of the at least two grain sizes of the aggregates for a time period based on a difference between the read start and the query start and between the read end and the query end, wherein a specific larger grain size is equivalent to a set number of the smaller grain size such that each comprises a same type of data at a different level of granularity, and wherein the second set is read over a different range than the first set;

adjusting the first set with the second set by one or more of:

subtracting a first portion of the second set at either or both ends of the dimension of the first set where the first portion of the second set overlaps the first set, and adding a second portion of the second set at either or both ends of the dimension of the first set where the second portion of the second set overlaps the first set; and providing a response to the query based on the adjusted first set.

12. The non-transitory computer readable medium of claim 11, wherein the instructions executable by the processor, and in response to such execution further causes the processor to perform operations comprising:

maintaining the aggregates based on the dimension comprising time and with one of the at least two grain sizes comprising a day based on GMT boundaries.

13. The non-transitory computer readable medium of claim 11, wherein the at least two grain sizes comprise a fine grain and a coarse grain, and wherein the instructions executable by the processor, and in response to such execution further causes the processor to perform operations comprising:

processing the coarse grain aggregates to form the first set; and performing one or more of processing the fine grain aggregates from the second set and excluding the fine grain aggregates from the second set to perform the adjusting.

14. The non-transitory computer readable medium of claim 11, wherein the instructions executable by the processor, and in response to such execution further causes the processor to perform operations comprising:

receiving the query with the defined range and a time interval; and processing the aggregates based on the time interval.

15. The non-transitory computer readable medium of claim 11, wherein the exclusion threshold is set to half a value of the larger grain size.

* * * * *